(12) United States Patent
Miyada et al.

(10) Patent No.: US 12,525,062 B2
(45) Date of Patent: Jan. 13, 2026

(54) SYSTEM, INFORMATION PROCESSING METHOD, AND INFORMATION PROCESSING PROGRAM

(71) Applicant: Sony Interactive Entertainment Inc., Tokyo (JP)

(72) Inventors: Naoyuki Miyada, Tokyo (JP); Hideki Yanagisawa, Kanagawa (JP); Mamiko Ishida, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 334 days.

(21) Appl. No.: 18/554,028

(22) PCT Filed: Mar. 24, 2022

(86) PCT No.: PCT/JP2022/013836
§ 371 (c)(1),
(2) Date: Oct. 5, 2023

(87) PCT Pub. No.: WO2022/220049
PCT Pub. Date: Oct. 20, 2022

(65) Prior Publication Data
US 2024/0127629 A1    Apr. 18, 2024

(30) Foreign Application Priority Data

Apr. 13, 2021 (JP) .................. 2021-067661

(51) Int. Cl.
*G06V 40/20* (2022.01)
*A63F 13/211* (2014.01)
*A63F 13/213* (2014.01)

(52) U.S. Cl.
CPC ............ *G06V 40/28* (2022.01); *A63F 13/211* (2014.09); *A63F 13/213* (2014.09)

(58) Field of Classification Search
None
See application file for complete search history.

(56) References Cited

U.S. PATENT DOCUMENTS 8,237,655 B2   8/2012   Yabe
9,389,693 B2   7/2016   Lee
(Continued)

FOREIGN PATENT DOCUMENTS

JP   2010045658 A   2/2010
JP   2014535098 A   12/2014
(Continued)

OTHER PUBLICATIONS

International Search Report for corresponding PCT Application No. PCT/JP2022/013836, 4 pages, dated Jun. 21, 2022.

*Primary Examiner* — Dov Popovici
(74) *Attorney, Agent, or Firm* — Kilpatrick Townsend & Stockton LLP

(57) ABSTRACT

A system includes a first image sensor that generates a first image signal by synchronously scanning all pixels at a prescribed timing, a second image sensor including an event-driven type vision sensor that, upon detecting a change in an intensity of incident light on each pixel, generates a second image signal asynchronously, an inertial sensor that acquires attitude information on the first image sensor and the second image sensor, a first computation processing device that recognizes a user on the basis of at least the second image signal and calculates coordinate information regarding the user on the basis of at least the second image signal, a second computation processing device that performs coordinate conversion on the coordinate information on the basis of the attitude information, and an image generation device that generates a display image (Continued)

which indicates a condition of the user, on the basis of the converted coordinate information.

8 Claims, 9 Drawing Sheets

(56) References Cited

U.S. PATENT DOCUMENTS

| | | | |
|---|---|---|---|
| 11,044,424 B2 | 6/2021 | Moriya | |
| 11,122,224 B2 | 9/2021 | Suh | |
| 2011/0244956 A1* | 10/2011 | Sakakibara | A63F 13/213 |
| | | | 463/31 |
| 2014/0320403 A1 | 10/2014 | Lee | |
| 2014/0333533 A1* | 11/2014 | Yabe | H04N 21/42203 |
| | | | 345/157 |
| 2018/0146149 A1* | 5/2018 | Suh | H04N 25/76 |
| 2020/0068111 A1* | 2/2020 | Naing | H04N 23/71 |
| 2021/0084242 A1 | 3/2021 | Moriya | |
| 2023/0353860 A1* | 11/2023 | Miyada | H04N 23/611 |

FOREIGN PATENT DOCUMENTS

| | | | |
|---|---|---|---|
| JP | 2017191576 A | 10/2017 | |
| JP | 2018085725 A | 5/2018 | |
| JP | 2020086836 A | 6/2020 | |
| JP | 2020181123 A | 11/2020 | |
| JP | 2021048456 A | 3/2021 | |

* cited by examiner

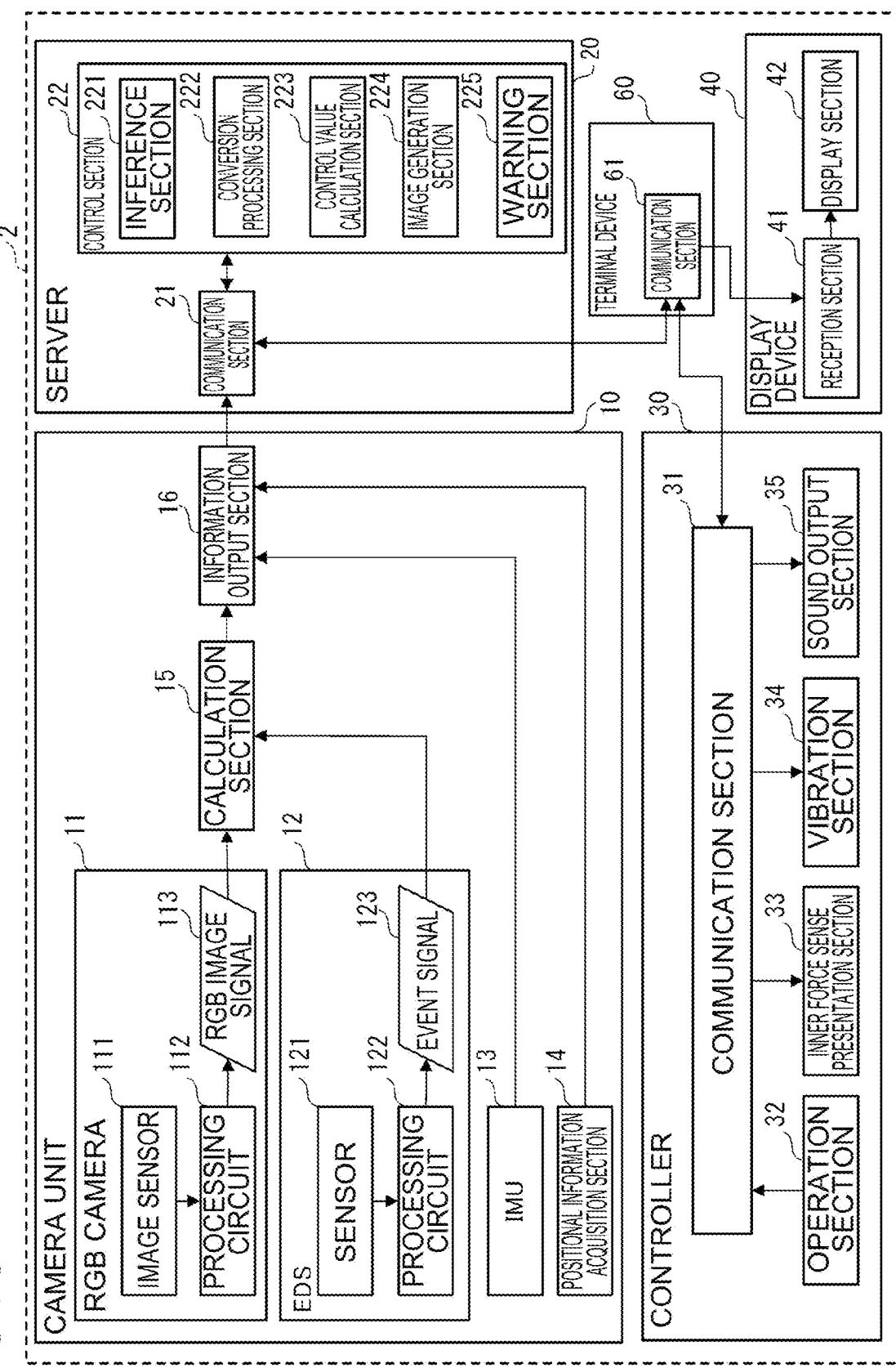

SYSTEM, INFORMATION PROCESSING METHOD, AND INFORMATION PROCESSING PROGRAM

TECHNICAL FIELD

The present invention relates to a system, an information processing method, and an information processing program.

BACKGROUND ART

An event-driven type vision sensor in which pixels detect a change in the intensity of incident light, and then, time-asynchronously generate signals, has been known. Over frame-type vision sensors which are configured to scan all pixels in every prescribed cycle, or specifically, image sensors such as a CCD (Charge Coupled Device) and a CMOS (Complementary Metal-Oxide-Semiconductor), event-driven type vision sensors have an advantage in that these vision sensors can speedily work with low electric power. For example, PTL 1 and PTL 2 disclose technologies related to this type of event-driven type vision sensor.

CITATION LIST

Patent Literature

[PTL 1] Japanese Patent Laid-open No. 2014-535098
[PTL 2] Japanese Patent Laid-open No. 2018-85725

SUMMARY

Technical Problem

However, although the abovementioned advantage of event-driven type vision sensors has been known, methods for using such an event-driven type vision sensor in combination with another device have not been sufficiently proposed.

Therefore, an object of the present invention is to provide a system, an information processing method, and an information processing program in which coordinate information regarding a user is calculated on the basis of an image signal generated by an image sensor, coordinate conversion is performed on the coordinate information on the basis of information on the attitude of the image sensor, and then, a display image indicating a user's condition is generated on the basis of the converted coordinate information, so that a display image can be generated in accordance with a more precise user's condition while a latency is suppressed.

Solution to Problem

A certain aspect of the present invention provides a system including a first image sensor that generates a first image signal by synchronously scanning all pixels at a prescribed timing, a second image sensor including an event-driven type vision sensor that, upon detecting a change in an intensity of incident light on each of the pixels, generates a second image signal asynchronously, an inertial sensor that acquires attitude information on the first image sensor and the second image sensor, a first computation processing device that recognizes a user on the basis of at least the second image signal, and calculates coordinate information regarding the user on the basis of at least the second image signal, a second computation processing device that performs coordinate conversion on the coordinate information on the basis of the attitude information, and an image generation device that generates a display image which indicates a condition of the user, on the basis of the converted coordinate information.

Another aspect of the present invention provides an information processing method for generating a display image to be displayed on a display apparatus, the method including an acquisition step of acquiring a first image signal generated by a first image sensor that synchronously scans all pixels at a prescribed timing, and a second image signal generated by a second image sensor including an event-driven type vision sensor that, upon detecting a change in an intensity of incident light on each of the pixels, generates the second image signal asynchronously, a calculation step of recognizing a user on the basis of at least the second image signal, and calculating coordinate information regarding the user on the basis of at least the second image signal, a conversion processing step of performing coordinate conversion on the coordinate information on the basis of attitude information on the first image sensor and the second image sensor, and an image generation step of generating the display image so as to indicate a condition of the user, on the basis of the converted coordinate information.

Still another certain aspect of the present invention provides an information processing program for causing a computer to implement a function of acquiring a first image signal generated by a first image sensor that synchronously scans all pixels at a prescribed timing, and a second image signal generated by a second image sensor including an event-driven type vision sensor that, upon detecting a change in an intensity of incident light on each of the pixels, generates the second image signal asynchronously, a function of recognizing a user on the basis of at least the second image signal, and calculating coordinate information regarding the user on the basis of at least the second image signal, a function of performing coordinate conversion on the coordinate information on the basis of attitude information on the first image sensor and the second image sensor, and a function of generating a display image which indicates a condition of the user, on the basis of the converted coordinate information.

According to the abovementioned configurations, coordinate information regarding a user is calculated on the basis of an image signal generated by an image sensor, and coordinate conversion is performed on the coordinate information on the basis of information on the attitude of the image sensor. Then, a display image indicating a user's condition is generated on the basis of the converted coordinate information. Accordingly, a display image can be generated in accordance with a more precise user's condition while a latency is suppressed.

BRIEF DESCRIPTION OF DRAWINGS

FIG. 9 is a block diagram depicting a schematic configuration of a system according to another embodiment of the present invention.

DESCRIPTION OF EMBODIMENTS

Hereinafter, some embodiments of the present invention will be explained in detail with reference to the drawings. It is to be noted that components having substantially the same functional structure are denoted by the same reference signs throughout the present description and the drawings, and a redundant explanation thereof will be omitted.

Figure 1:
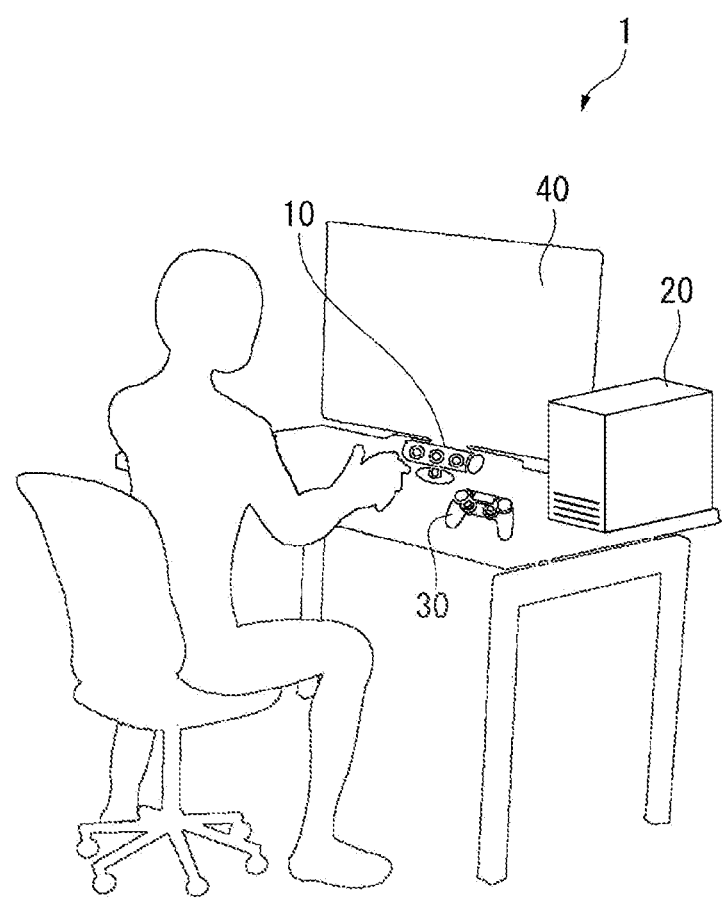
FIG. 1 is a schematic general view of a system according to one embodiment of the present invention.

FIG. 1 is a schematic general view of a system 1 according to the present embodiment. The system 1 according to the present embodiment is a game system that includes a camera unit 10 which is a sensor apparatus, an information processing apparatus 20, a controller 30, and a display apparatus 40, as depicted in FIG. 1. The information processing apparatus 20 is connected to the camera unit 10, the controller 30, and the display apparatus 40 over a wired or wireless network. In the system 1, the information processing apparatus 20 advances a game according to information sent from the camera unit 10 and the controller 30, and the display apparatus 40 displays an in-execution screen (e.g. game screen) of the information processing apparatus 20.

In the present embodiment, the camera unit 10 calculates coordinate information regarding a user who is a player of the game, and sends the coordinate information to the information processing apparatus 20. Coordinate information regarding a user includes at least one of coordinate information regarding the posture of the user, coordinate information regarding the shape of a user's arm, coordinate information regarding the shape of a user's hand/finger, and coordinate information regarding the attitude of an external apparatus such as the controller 30 being mounted on or being held by the user. Since the camera unit 10 calculates and outputs the coordinate information regarding the user, the camera unit 10, as with the controller 30, functions as an operation apparatus for receiving a user operation. In order to calculate the coordinate information regarding the user, the camera unit 10 is disposed in a position (for example, at a distance of approximately 1 meter from the user) for including the user within the field such that the elevation angle can be manually or electrically changed. In FIG. 1, the camera unit 10 is positioned near the display apparatus 40. The details of the position of the camera unit 10 will be explained later.

Figure 2:
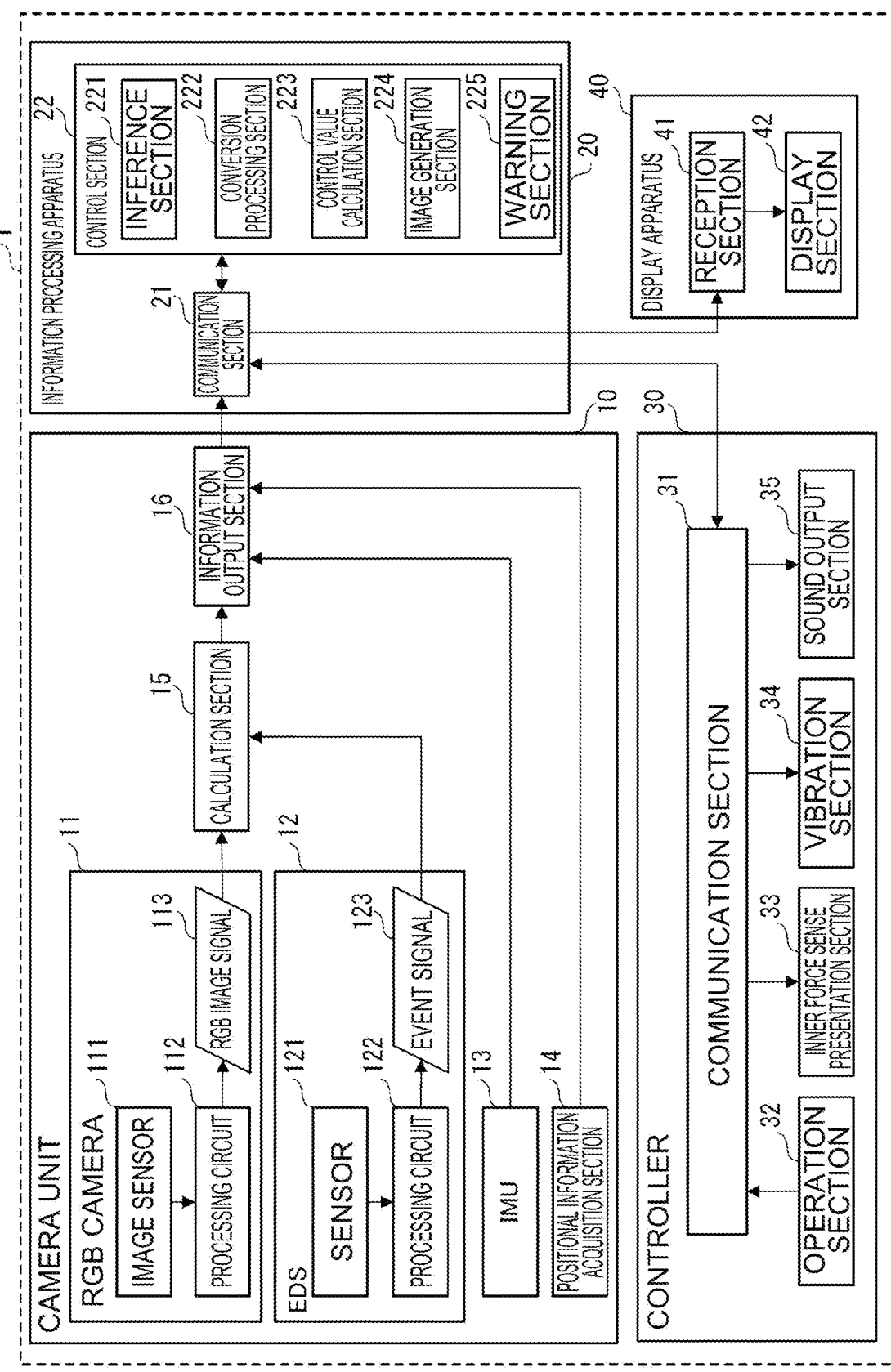
FIG. 2 is a block diagram depicting a schematic configuration of the system according to one embodiment of the present invention.

Hereinafter, components in the system 1 will be explained. FIG. 2 is a block diagram depicting a schematic configuration of a system according to one embodiment of the present invention. The camera unit 10 includes an RGB camera 11, an EDS (Event Driven Sensor) 12, an IMU (Inertial Measurement Unit) 13, a positional information acquisition section 14, a calculation section 15 that functions as a first computation processing device, and an information output section 16. The RGB camera 11 includes an image sensor 111 which is a first image sensor, and a processing circuit 112 that is connected to the image sensor 111. The image sensor 111 generates an RGB image signal 113 which is a first image signal by synchronously scanning all pixels in a prescribed cycle or at a prescribed timing corresponding to a user operation, for example. The processing circuit 112 converts the RGB image signal 113 into a format that is suitable to be saved or transferred, for example. In addition, the processing circuit 112 gives a time stamp to the RGB image signal 113.

The EDS 12 includes a sensor 121 which is a second image sensor constituting a sensor array, and a processing circuit 122 that is connected to the sensor 121. The sensor 121 includes a light reception element, and is an event-driven type vision sensor that generates an event signal 123 which is a second image signal upon detecting a change in the intensity of incident light on each pixel, or more specifically, detecting a brightness change that is greater than a predetermined value. The event signal 123 outputted through the processing circuit 122 includes identification information (e.g. pixel position) regarding the sensor 121, the polarity (increase/reduction) of the brightness change, and the time stamp. In addition, when the brightness change is detected, the EDS 12 can generate the event signal 123 with a frequency that is much higher than the frequency of generating the RGB image signal 113 (the frame rate of the RGB camera 11). In addition, the EDS 12 can generate the event signal 123 with a frequency that is much higher than the frequency of generating the RGB image signal 113 (the frame rate of the RGB camera 11). It is to be noted that a signal on the basis of which an image can be formed is referred to as an image signal, herein. Therefore, the RGB image signal 113 and the event signal 123 exemplify image signals.

In the present embodiment, a time stamp given to the RGB image signal 113 is in synchronization with a time stamp given to the event signal 123. Specifically, time information that is used to generate the time stamp at the EDS 12 is provided to the RGB camera 11, whereby the time stamp given to the RGB image signal 113 is in synchronization with the time stamp given to the event signal 123. Alternatively, in a case where time information that is used to generate the time stamp at the RGB camera 11 is independent from that at the EDS 12, an offset amount of time stamps is calculated with respect to a time when a specific event (e.g. a change in a subject on the whole image) occurs, whereby the time stamp given to the RGB image signal 113 is in synchronization with the time stamp given to the event signal 123.

In addition, in the present embodiment, the sensor 121 of the EDS 12 is associated with one or more pixels of the RGB image signal 113 as a result of calibration procedures which are preliminarily executed in the RGB camera 11 and the EDS 12, and the event signal 123 is generated according to a change in the intensity of light on the one or more pixels in the RGB image signal 113. More specifically, the same calibration pattern is imaged by the RGB camera 11 and the EDS 12, and a corresponding parameter between the camera and the sensor is calculated from respective internal parameters and external parameters of the RGB camera 11 and the EDS 12, whereby the sensor 121 is associated with one or more pixels in the RGB image signal 113.

The IMU 13 is an inertial sensor that detects the attitude of the camera unit 10 itself, or more specifically, the attitudes of the image sensor 111 and the sensor 121. The IMU 13 acquires three-dimensional attitude information on the image sensor 111 and the sensor 121 in a prescribed cycle or at a prescribed timing. The attitude information indicates the abovementioned elevation angle of the camera unit 10. The IMU 13 outputs the acquired attitude information to the information output section 16.

The positional information acquisition section 14 acquires positional information from a GPS (Global Positioning System) satellite, for example, and outputs the positional information to the information output section 16. It is to be noted that the positional information acquisition section 14 may acquire positional information or the like from a radio base station rather than or in addition to the GPS satellite.

Figure 3:
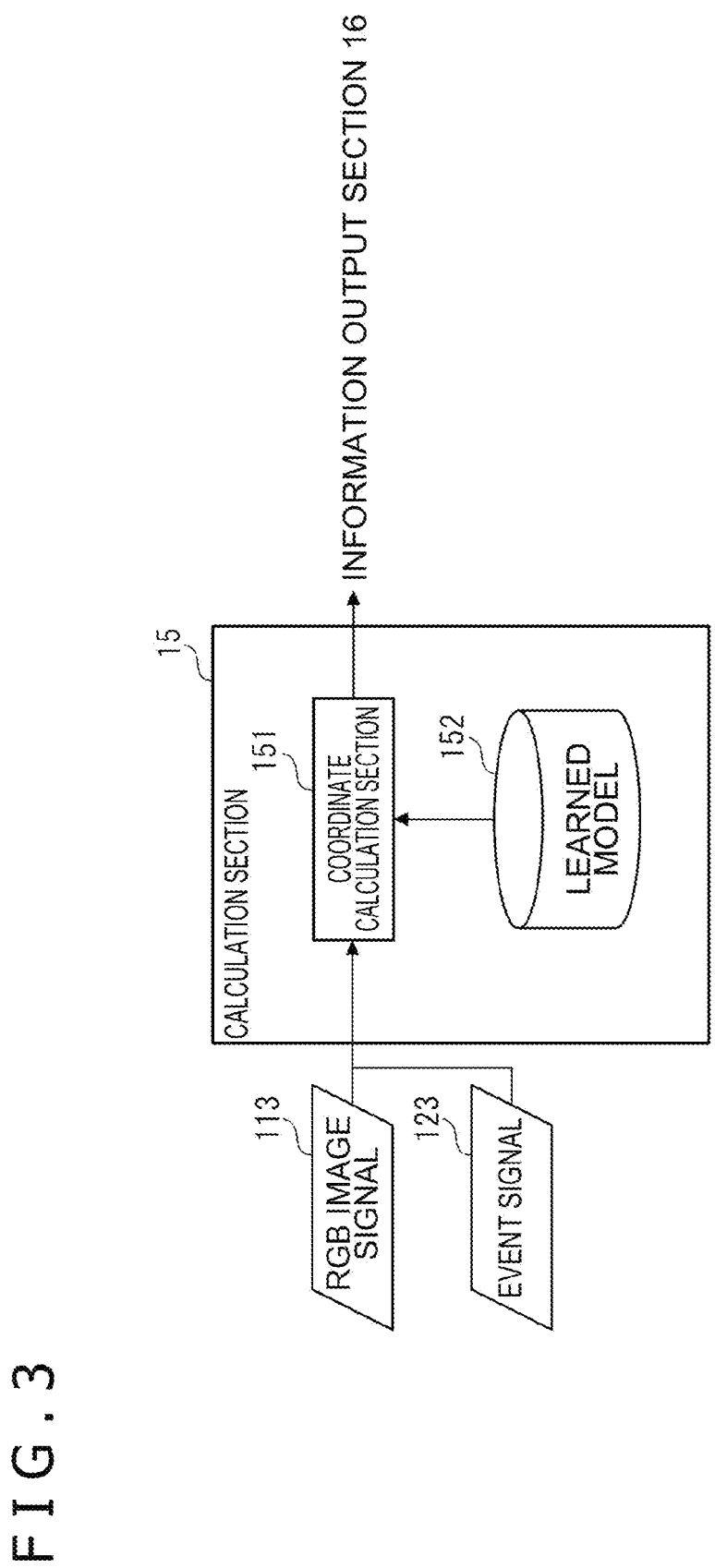
FIG. 3 is a block diagram depicting a schematic configuration of a calculation section of the system according to one embodiment of the present invention.

The calculation section 15 calculates coordinate information regarding the user on the basis of the event signal 123 generated at the EDS 12 and the RGB image signal 113 generated at the RGB camera 11. FIG. 3 is a block diagram depicting a schematic configuration of the calculation section 15. The calculation section 15 includes a coordinate calculation section 151 and a learned model 152. The coordinate calculation section 151 of the calculation section 15 recognizes the user by detecting an object that is present in the region of continuous pixels where events having the same polarity have occurred in the event signal 123 and performing subject recognition on the basis of the corresponding part in the RGB image signal 113. In a case where multiple users are included in the field of the camera unit 10, the coordinate calculation section 151 recognizes each of the users.

Then, the coordinate calculation section 151 calculates coordinate information regarding each of the recognized users, which indicates the positions of the multiple joints of the user, from the RGB image signal 113 according to the learned model 152. The learned model 152 can be previously constructed as a result of supervised learning in which an image of a person having multiple joints is input data while coordinate information indicating the positions of the multiple joints of the person is correct data. It is to be noted that a specific method for the machine learning will be omitted because any publicly-known technology can be used therefor. In an alternative configuration, the calculation section 15 may include a relation learning section to learn the relation between an image based on the RGB image signal 113 and the coordinate information indicating the positions of the joints each time the RGB image signal 113 is inputted, whereby the learned model 152 is updated.

Further, the coordinate calculation section 151 recognizes the controller 30 being held by each of the recognized users. The coordinate calculation section 151 recognizes the controller 30 by performing subject recognition on a part, in the RGB image signal 113, corresponding to an area near a user's hand on the basis of the coordinate information indicating the positions of the multiple joints of the user calculated by the coordinate calculation section 151, for example. In a case where the user is not holding the controller 30, the coordinate calculation section 151 calculates information so as to indicate that "the user is not holding the controller 30," instead of the coordinate information. Furthermore, the coordinate calculation section 151 infers the attitude of the recognized controller 30. The coordinate calculation section 151 infers the shape of the controller 30 on the basis of a result of the abovementioned subject recognition included in the RGB image signal 113, and infers the attitude of the controller 30 on the basis of the inferred shape. It is to be noted that, in a case where the controller 30 is equipped with an inertial sensor or the like for detecting the attitude of the controller 30 itself, the attitude of the controller 30 may be inferred in view of an output from the sensor. In a case where multiple users are included in the field, the coordinate calculation section 151 infers the attitudes of the controllers 30 being held by the respective users. It is to be noted that the coordinate calculation section 151 may infer the attitude of the controller 30 by using a machine learning method that uses the abovementioned learned model.

The information output section 16 outputs the coordinate information regarding the user calculated by the calculation section 15, the attitude information acquired by the IMU 13, and the positional information acquired by the positional information acquisition section 14, to the information processing apparatus 20.

As explained so far, a procedure, from generation of the RGB image signal 113 and the event signal 123 to calculation of the coordinate information regarding the user, is completed in the camera unit 10 alone, and the camera unit 10 can output the calculated coordinate information and attitude information to the information processing apparatus 20 without outputting the RGB image signal 113 and the event signal 123. It is to be noted that the camera unit 10 is preferably equipped with an independent power source.

Figure 4A:
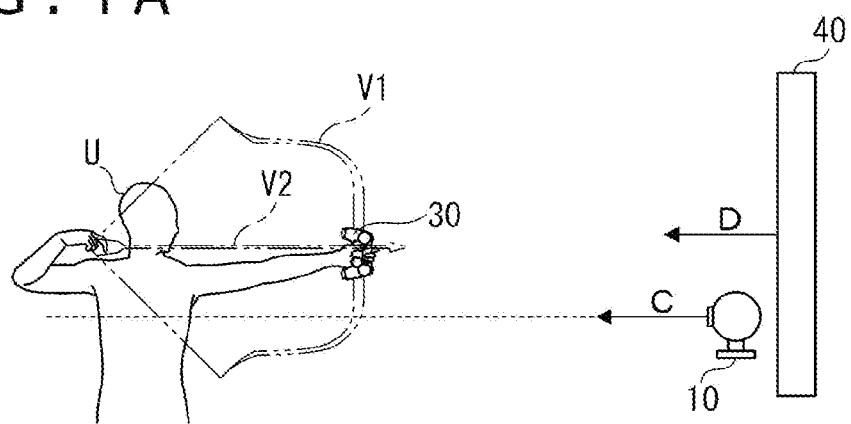
FIG. 4A is an explanatory diagram of attitude information on a camera unit according to one embodiment of the present invention.
Figure 4B:
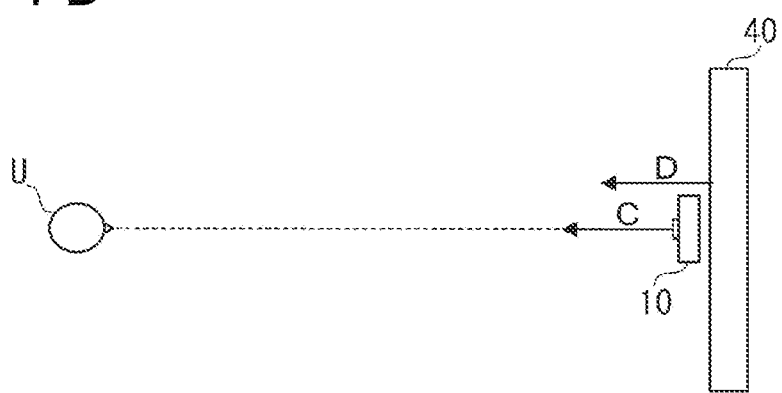
FIG. 4B is another explanatory diagram of attitude information on the camera unit according to the embodiment of the present invention.

Next, the position of the camera unit 10 will be explained. The camera unit 10 is positioned in such a way that the user is included in the field, as explained above. FIGS. 4A and 4B each depict a basic installation state of the camera unit 10. FIG. 4A is a side view of the positional relation between a user U, the camera unit 10, and the display apparatus 40. FIG. 4B is a top view of the positional relation between the user U, the camera unit 10, and the display apparatus 40.

In the basic installation state, the user U directly faces the display apparatus 40 while the camera unit 10 is disposed, on the user U side of the display apparatus 40, so as to directly face the user U, as depicted in FIGS. 4A and 4B. In the basic installation state, the user U, the imaging direction (arrow C) of the camera unit 10, and the display direction (arrow D) of the display apparatus 40 are in substantially parallel with each other.

It is to be noted that the basic installation state is realized when the information processing apparatus 20 displays a tutorial or the like on the display apparatus 40 to prompt the user U to put the camera unit 10 in a correct position, for example. Whether the basic installation state is properly realized can be determined by test photographing using the camera unit 10 and evaluation of the generated RGB image signal 113 and the generated event signal 123. In addition, in a case where the basic installation state has been realized, the attitude information acquired by the IMU 13 and the positional information generated by the positional information acquisition section 14 are regarded as attitude information and positional information during the basic installation state, respectively. The attitude information and the positional information during the basic installation state are outputted from the information output section 16, and are used for information processing at the information processing apparatus 20.

Meanwhile, when the user U is in a certain condition, it may be difficult for the calculation section 15 to calculate the coordinate information under the basic installation state. For example, it is assumed that the user U is in a posture of holding a bow and arrow in a certain game and operates a virtual bow V1 and a virtual arrow V2 while grasping the center portion of the controller 30 with the left hand and moving the right hand, as depicted in FIG. 4A. In such a case, there is a concern that the controller 30 and both hands of the user U overlap each other when viewed from the camera unit 10. For this reason, it is very difficult to calculate the coordinate information by recognizing the controller 30 from both hands of the user U separately in the generated RGB image signal 113 and the event signal 123.

Figure 5:
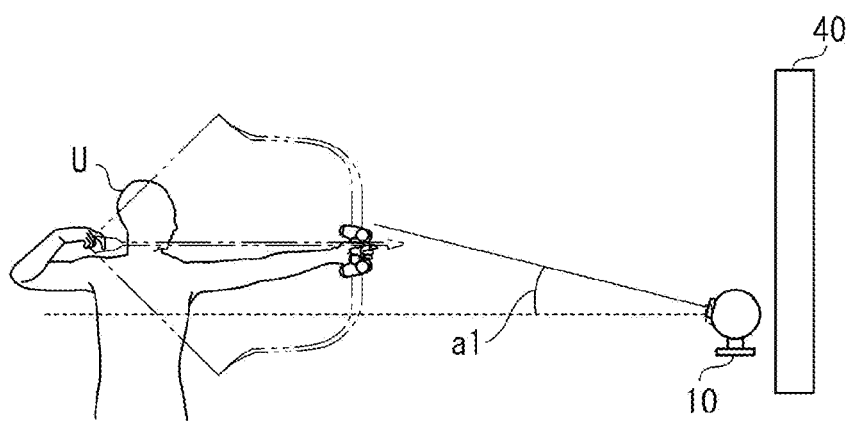
FIG. 5 is another explanatory diagram of attitude information on the camera unit according to the embodiment of the present invention.

In such a case, the installation state of the camera unit 10 is adjusted so as to inhibit the controller 30 from overlapping with any body parts of the user U, as depicted in FIG. 5. Accordingly, the controller 30 and both hands of the user U can be recognized separately in the generated RGB image signal 113 and the event signal 123, and the coordinate information can be calculated. FIG. 5 is a side view of the positional relation between the user U, the camera unit 10, and the display apparatus 40. FIG. 5 depicts an example in which the position of the camera unit 10 is left unchanged but the elevation angle is changed by an angle a1. The angle a1 can be obtained from the attitude information acquired by the IMU 13.

Figure 6A:
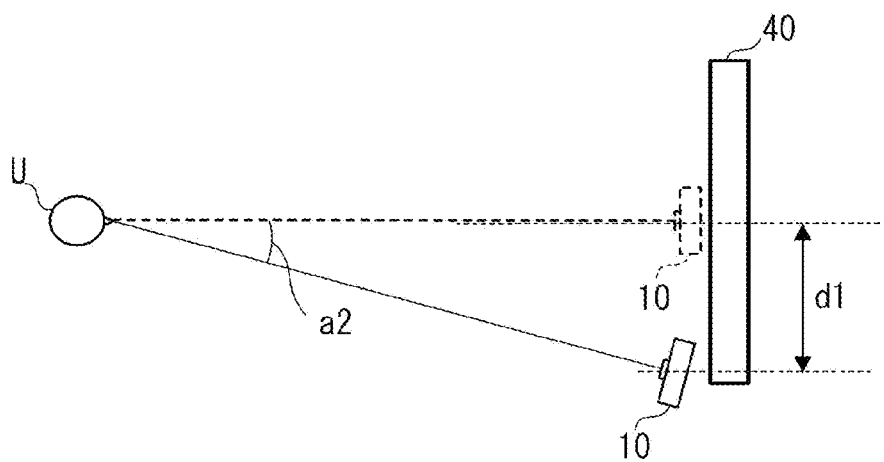
FIG. 6A is an explanatory diagram of positional information on a camera unit according to one embodiment of the present invention.
Figure 6B:
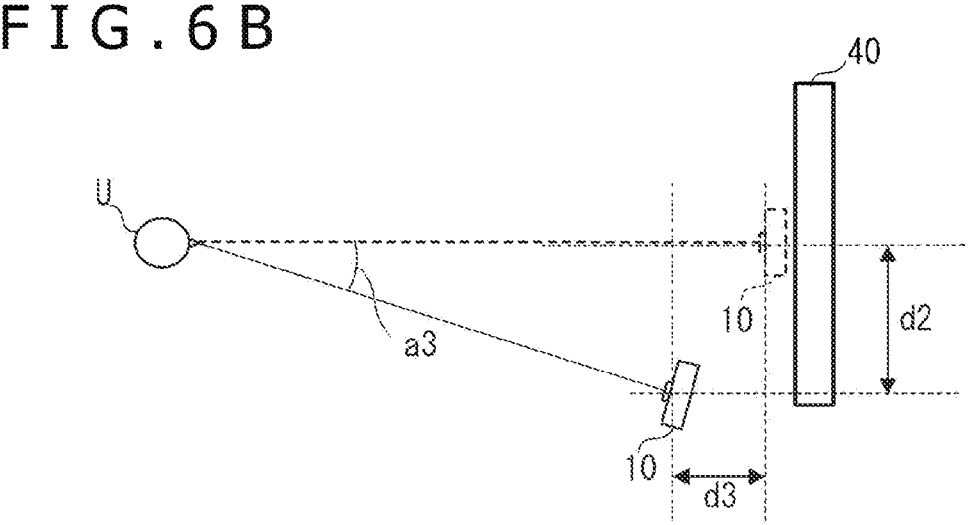
FIG. 6B is another explanatory diagram of positional information on the camera unit according to the embodiment of the present invention.

Further, the installation state of the camera unit may be adjusted, as depicted in FIGS. 6A and 6B. FIGS. 6A and 6B are top views of the positional relation between the user U, the camera unit 10, and the display apparatus 40.

FIG. 6A depicts an example in which the elevation angle of the camera unit 10 is left unchanged but the position of the camera unit is changed by a distance d1 with respect to a horizontal direction when the display apparatus 40 is viewed from the user U. The distance d1 can be obtained from the positional information acquired by the positional information acquisition section 14. In addition, an angle a2, which is a rotational angle about the user U, can be obtained from the attitude information acquired by the IMU 13.

FIG. 6B depicts an example in which the elevation angle of the camera unit 10 is left unchanged but the position of the camera unit is changed by a distance d2 with respect to a horizontal direction when the display apparatus 40 is viewed from the user U, and furthermore, the position of the camera unit is changed by a distance d2 with respect to the front-rear direction. The distance d2 and the distance d3 can be obtained from the positional information acquired by the positional information acquisition section 14. In addition, an angle a3 which is a rotational angle about the user U, is obtained from the attitude information acquired by the IMU 13.

It is to be noted that an optimum installation state of the camera unit 10 with respect to the user U and the display apparatus 40 varies according to a purpose. For example, according to the content or a scene of a game to be played, a target to be grasped (the whole body, the upper body, the hands of the user, etc.) varies. Further, a position that can be grasped also varies. Therefore, like the abovementioned basic installation state, the optimum installation state may also be realized by displaying a tutorial or the like on the display apparatus 40 by means of the information processing apparatus 20 to prompt the user U to put the camera unit 10 in a correct position, for example. Whether the optimum installation state is properly realized can be determined by test photographing using the camera unit 10 and evaluation of the generated RGB image signal 113 and the generated event signal 123.

Referring back to FIG. 2, the information processing apparatus 20 is implemented by a computer equipped with a communication interface, a processor, and a memory, and includes a communication section 21 and a control section 22 that function as a second computation processor and an image generator. The control section 22 includes functions of an inference section 221, a conversion processing section 222, a control value calculation section 223, an image generation section 224, and a warning section 225 that are implemented by the processor operating according to a program which is stored in the memory or is received via the communication interface. Hereinafter, the functions of these sections will be explained in more details.

The communication section 21 receives information outputted from the information output section 16 of the camera unit 10. In addition, the communication section 21 is capable of mutually communicating with the controller 30, and outputs a display image to be displayed on the display apparatus 40.

The inference section 221 of the control section 22 infers the relative positional relation between the display apparatus 40 and the camera unit 10 on the basis of the attitude information and the positional information acquired through the communication section 21. As explained above, the positional relation among the user U, the camera unit 10, and the display apparatus 40 can be obtained from the attitude information acquired by the IMU 13 and the positional information acquired by the positional information acquisition section 14.

The conversion processing section 222 performs coordinate conversion on the coordinate information regarding the user on the basis of the positional relation inferred by the inference section 221. More specifically, the conversion processing section 222 performs coordinate conversion of converting the coordinate information regarding the user acquired through the communication section 21 onto a coordinate system that is under the abovementioned basic installation state. This conversion can be performed through a publicly known coordinate conversion. As a result of the coordinate conversion, coordinate information that is obtained by calculation based on the RGB image signal 113 and the event signal 123 generated when the camera unit 10 is deviated from the basic installation state, can be converted into coordinate information to be generated under the basic installation state.

The control value calculation section 223 calculates a control value of feedback control to external apparatuses including the controller 30 and the display apparatus 40 on the basis of the coordinate information acquired through the communication section 21 and the information received from the controller 30. The camera unit 10 and the controller 30 function as operation apparatuses for receiving user operations, as explained above. Therefore, the control value calculation section 223 calculates a control value of feedback control to external apparatuses including the controller 30 and the display apparatus 40 in response to a user operation performed through at least one of the camera unit 10 and the controller 30. Through the communication section 21, the calculated control value is outputted to the controller 30.

The image generation section 224 generates a display image which indicates a condition of the user, on the basis of the converted coordinate information obtained by the conversion processing section 222. More specifically, the image generation section 224 generates a display image to be displayed on the display apparatus 40, according to the control value calculated by the control value calculation section 223. Through the communication section 21, the generated display image is outputted to the display apparatus 40. It is to be noted that examples of the display image include what is called a first person view image which is a reproduction of a user's viewpoint, and what is called a third person view image which indicates a user viewed from the outside. The type of the display image for use is determined according to a purpose (e.g. the content or a scene of a game to be played). In addition, the details of calculation of the control value and generation of the display image will be explained later in connection with an explanation of the configurations of the controller 30 and the display apparatus 40.

The warning section 225 performs a warning action in a case where a change in the attitude information or the positional information exceeds a prescribed threshold value. The warning action may include indicating a warning message on the display apparatus 40, or audibly outputting a warning message, for example.

The case where a change in the attitude information or the positional information exceeds the prescribed threshold value refers to a case where the installation state of the camera unit 10 needs to be changed because the installation state of the camera unit 10 is not suitable to calculate coordinate information or coordinate information is difficult to calculate after the installation state of the camera unit 10 is changed. On the other hand, a case where the change amount is less than the prescribed threshold value refers to a case where the installation state of the camera unit 10 does not need to be changed because the installation state of the camera unit 10 is suitable to calculate coordinate information or the installation state of the camera unit 10 is changed but the installation state change can be complemented by processes to be performed by the abovementioned sections. It is to be noted that the threshold value may vary according to a purpose. For example, the threshold value may vary according to an allowable range suitable for a scene or the content of a game to be played.

The controller 30 includes a communication section 31, an operation section 32, an inner force sense presentation section 33, a vibration section 34, and a sound output section 35, as depicted in FIG. 2. The user can perform a variety of operations concerning a game by operating the controller 30.

The communication section 31 receives the control value outputted from the communication section 21 of the information processing apparatus 20, and outputs the control value to the inner force sense presentation section 33, the vibration section 34, and the sound output section 35. In addition, the communication section 31 outputs, to the information processing apparatus 20, information regarding the user operation received by the operation section 32.

The operation section 32 is equipped with multiple operation elements including a button and a pad. The operation section 32 receives an input of a user operation performed on the operation elements.

The inner force sense presentation section 33 is disposed on at least a part of the operation elements of the operation section 32. The inner force sense presentation section 33 provides a force to resist the user operation or a force interlocked with the user operation to the user according to the control value supplied from the information processing apparatus 20. Specifically, the inner force sense presentation section 33 can be formed of an actuator or a motor including a rotary rotor, for example. As an inner force sense presenter constituting the inner force sense presentation section 33, a widely-known one can be adopted. A detailed explanation thereof will be omitted.

The vibration section 34 generates vibrations according to the control value supplied from the information processing apparatus 20. The vibration section 34 can be formed of a motor, for example. When a user operation is performed, the vibration section 34 generates vibrations. Accordingly, the user can be informed that the user operation has been properly performed and recognized by the information processing apparatus 20.

The sound output section 35 is configured to output a sound according to the control value supplied from the information processing apparatus 20. The sound output section 35 can be formed of a loudspeaker, for example. When a user operation is performed, the sound output section 35 outputs a sound. Accordingly, the user can be informed that the user operation has been properly performed and recognized by the information processing apparatus 20.

It is to be noted that, in interlocking with the abovementioned inner force sense presented by the inner force sense presentation section 33, at least one of vibration by the vibration section 34 and sound output by the sound output section 35 is performed, whereby the variation of feedback control to the user can be enhanced.

The control value calculation section 223 of the information processing apparatus 20 calculates the control value of feedback control to the controller 30, as explained above. More specifically, the control value calculation section 223 calculates the control value of feedback control to the inner force sense presentation section 33, the vibration section 34, and the sound output section 35 of the controller 30. The control value calculation section 223 calculates, at this time, the control value of feedback control to the controller 30 on the basis of the coordinate information acquired through the communication section 21, which has not undergone the conversion by the conversion processing section 222. The coordinate information obtained under the optimal installation state where the controller 30 does not overlap with any body parts of the user U, is acquired through the communication section 21. Therefore, the control value is calculated on the basis of such coordinate information. As a result, the condition of the user can be precisely grasped and can be reflected in the control value. It is to be noted that, when calculating the control value, the control value calculation section 223 may supplementally use the converted coordinate information obtained by the conversion processing section 222.

For the inner force sense presentation section 33, the control value calculation section 223 calculates a control value that indicates what type of an inner force sense is to be presented as feedback control in response to a user operation. For the vibration section 34, the control value calculation section 223 calculates a control value that indicates what type of vibration is to be generated as feedback control in response to a user operation. For the sound output section 35, the control value calculation section 223 calculates a control value that indicates what type of a sound is to be outputted as feedback control in response to a user operation. The control value calculation section 223 can calculate a control value according to a predetermined expression, a table, or the like.

It is to be noted that a variety of publicly known configurations are applicable to the controller 30 which has been explained so far. For example, the controller 30 may be formed of a pair of controllers that can be held by both hands, a controller such as a keyboard to which characters can be inputted, or an application on a smartphone.

Alternatively, the controller 30 may be equipped with a sound input section to adopt a voice recognition technology. For example, the controller 30 may be equipped with a sound input section such as a microphone and a voice recognition section so that information indicating a command spoken by the user or a call uttered by the user is supplied to the information processing apparatus 20 through the communication section 31.

The display apparatus 40 includes a reception section 41 and a display section 42, as depicted in FIG. 2. The reception section 41 receives, via the communication section 21, information that indicates the display image generated by the image generation section 224 of the information processing apparatus 20. The display section 42 is equipped with a monitor such as an LCD (Liquid Crystal Display) or an organic EL (Electro-Luminescence) monitor, and can present the display image to the user by displaying the display image on the basis of the information received by the reception section 41.

It is to be noted that a variety of publicly known configurations are applicable to the abovementioned display apparatus 40. For example, the display apparatus 40 may be formed of a dedicated display, which is depicted in FIG. 1, or may be formed of a display such as an HMD (Head Mounted Display) which is mounted on a user's head. For example, a display section of the HMD may be equipped with a display element such as an LCD (Liquid Crystal Display) or an organic EL, and an optical device such as a lens, and the display element may be a transmission type display element or may be a non-transmission type display element. Further, a wearing type device of AR (Augmented Reality) glasses or MR (Mixed Reality) glasses may be used as the HMD. In addition, the abovementioned display apparatus 40 may be formed of a display of a computer or may be formed of a display of a terminal device such as a smartphone. In addition, a touch panel for detecting a contact may be provided on a surface of the display section 42.

The control value calculation section 223 of the information processing apparatus 20 calculates a control value of feedback control regarding a display image to be displayed on the display apparatus 40, as explained above. The control value calculation section 223 calculates the control value of feedback control on the display image on the basis of the converted coordinate information obtained by the conversion processing section 222. The converted coordinate information is obtained by conversion onto a coordinate system that is under the basic installation state. Since the control value is calculated on the basis of such coordinate information, a control value of feedback control for generating a display image from a fixed viewpoint can be calculated, irrespective of the installation state of the camera unit 10. It is to be noted that, when calculating the control value, the control value calculation section 223 may supplementally use the coordinate information that has been acquired through the communication section 21 and has not undergone the conversion by the conversion processing section 222. In addition, both the control value that is based on the coordinate information that has been acquired through the communication section 21 and has not undergone the conversion by the conversion processing section 222 and the control value that is based on the converted coordinate information may be calculated. The control value calculation section 223 calculates a control value that indicates a manner for changing the display image in the feedback control in response to a user operation. The control value calculation section 223 can calculate the control value in accordance with a predetermined expression or a table.

As explained above, the image generation section 224 of the information processing apparatus 20 generates the display image to be displayed on the display apparatus 40, according to the control value calculated by the control value calculation section 223. More specifically, according to the control value for changing the display image, the image generation section 224 generates a new display image to be displayed on the display apparatus 40. As explained above, the control value of feedback to the display image is calculated on the basis of the coordinate information obtained by conversion onto the coordinate system under the basic installation state. For this reason, even when the installation state of the camera unit 10 is changed due to a vibration or an external force, the change can be complemented, and the display image from a fixed viewpoint can be constantly generated. With such a configuration, occurrence of a shake or a sudden change can be suppressed in a display image so that what is rendered on the display apparatus 40 can be stabilized. It is to be noted that, to calculate both the control value that is based on the coordinate information acquired through the communication section 21 and the control value that is based on the converted coordinate information, the control value calculation section 223 uses the control value that is based on the coordinate information acquired through the communication section 21 for a part where precise rendering is required. Accordingly, more delicate rendering can be achieved.

Figure 7:
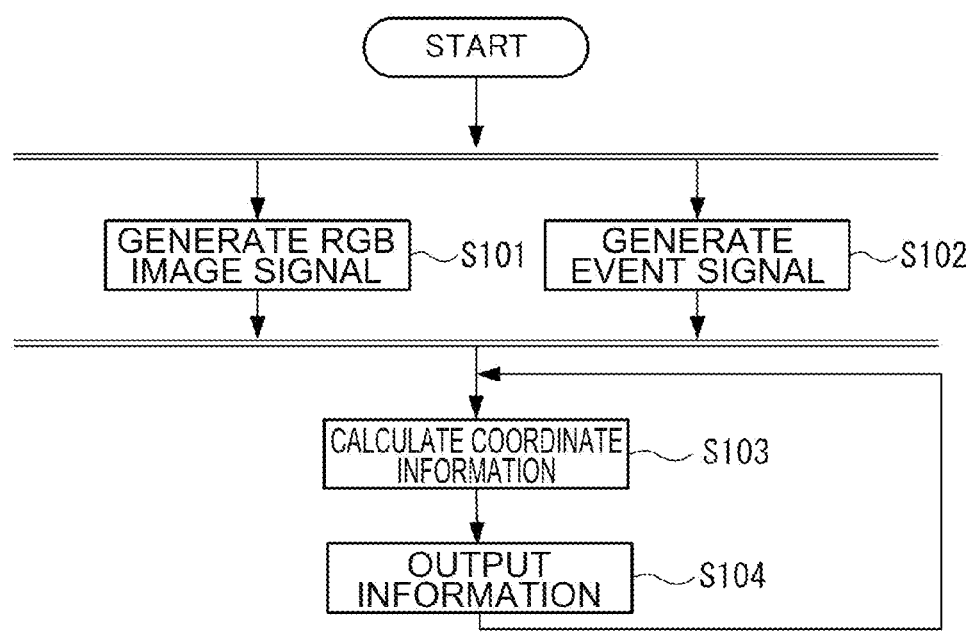
FIG. 7 is a flowchart illustrating an example of a processing method according to one embodiment of the present invention.

FIG. 7 is a flowchart illustrating an operation example of the camera unit 10 according to one embodiment of the present invention. In FIG. 7, the image sensor 111 of the RGB camera 11 generates the RGB image signal 113 (step S101), and further, the sensor 121 of the EDS 12 generates the event signal 123 (step S102). Then, the calculation section 15 calculates coordinate information regarding a user (step S103), and the information output section 16 outputs the coordinate information, attitude information, and positional information (step S104). The camera unit 10 repeats steps S103 to S104 (steps S101 to S102 are also repeated but are not necessarily performed in the same cycle of step S103 and later). As a result, various information indicating a condition of the user can be supplied to the information processing apparatus 20.

Figure 8:
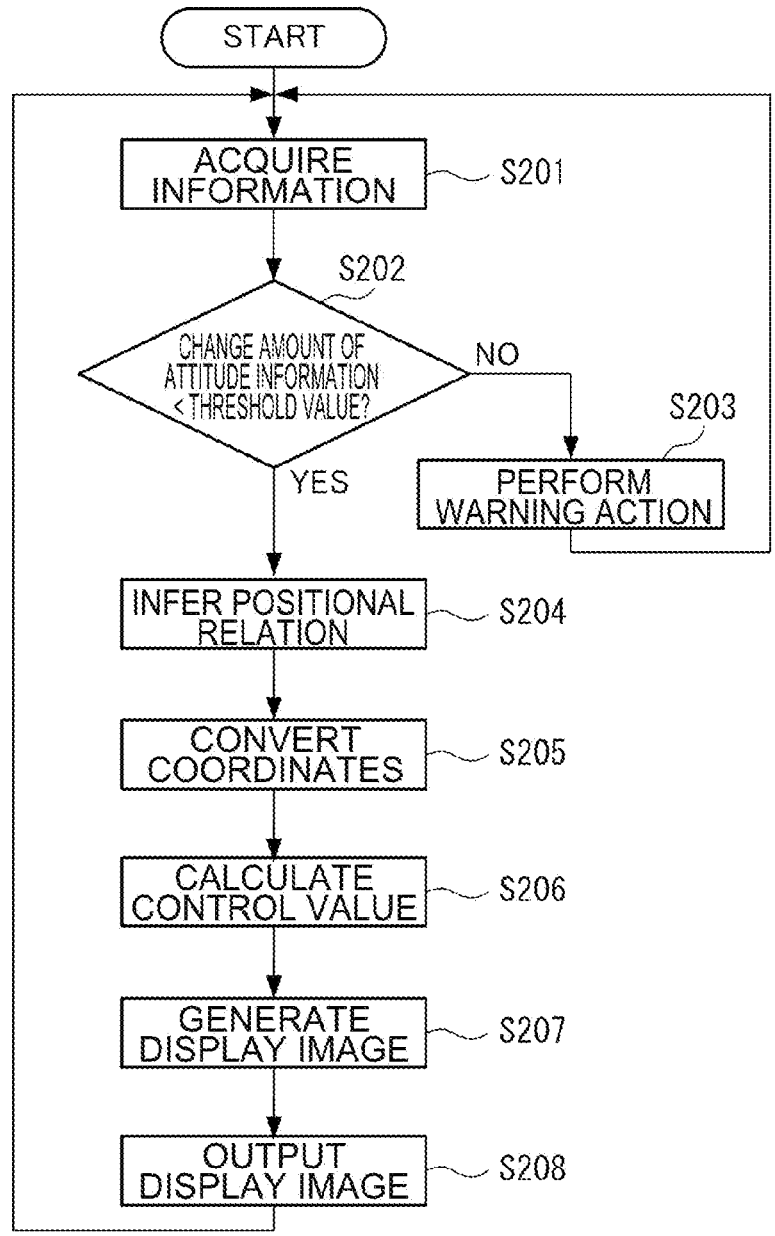
FIG. 8 is a flowchart illustrating another example of the processing method according to the embodiment of the present invention.

FIG. 8 is a flowchart illustrating an operation example of the information processing apparatus 20 according to one embodiment of the present invention. In FIG. 8, the communication section 21 acquires various information supplied from the camera unit 10 (step S201). Then, the warning section 208 compares a change amount of the attitude information with a prescribed threshold value (step S202). In a case where the change amount is equal to or greater than the prescribed threshold value (No at step S202), the warning section 208 performs a warning action (step S203) to prompt the user to change the setting state of the camera unit 10. On the other hand, in a case where the change amount is less than the prescribed threshold value (Yes at step S202), the process proceeds to step S204. It is to be noted that, instead of or in addition to the change amount of the attitude information, a change mount of the positional information may be compared with a prescribed threshold value at the determination process in step S202. As a result of such determination, the setting state of the camera unit 10 can be more strictly monitored, and the warning action can be performed at a proper timing.

In a case where the change amount is less than the prescribed threshold value or becomes less than the prescribed threshold value after the warning action, the inference section 221 of the control section 22 infers the relative positional relation between the camera unit 10 and the display apparatus 40 (step S204), and the conversion processing section 222 performs coordinate conversion on the coordinate information (step S205). Next, the control value calculation section 223 calculates a control value of feedback control (step S206), the image generation section 224 generates a display image on the basis of the control value (step S207), and the display image is outputted through the communication section 21 (step S208).

In the embodiment of the present invention explained so far, the camera unit 10 calculates the coordinate information regarding the user on the basis of the RGB image signal 113 and the event signal 123 respectively generated by the image sensor 111 and the sensor 121, and outputs the coordinate information as well as the attitude information on the image sensor 111 and the sensor 121, to the information processing apparatus 20. Then, the information processing apparatus 20 performs coordinate conversion on the coordinate information on the basis of the attitude information, and generates a display image which indicates a condition of the user, on the basis of the converted coordinate information. Consequently, irrespective of a change in the installation state of the camera unit 10, a display image that corresponds to a more precise condition of the user can be generated while a latency is suppressed. In addition, the degree of freedom of the installation position of the camera unit 10 can be improved.

In addition, a procedure, from generation of the RGB image signal 113 and the event signal 123 to calculation of the coordinate information regarding the user, is completed in the camera unit 10 alone, and the camera unit 10 can output the calculated coordinate information and the attitude information on the image sensor 111 and the sensor 121 without outputting the RGB image signal 113 and the event signal 123. Accordingly, problems concerning a communication load and a communication delay can be reduced. Moreover, there is an advantage in privacy protection because it is not necessary to output the RGB image signal 113 and the event signal 123. Further, since the camera unit 10 according to the one embodiment of the present invention can receive a user operation by calculating coordinate information regarding the user, user's physical fatigue for maintaining a cursor position, which has been caused in conventional pointing device type operation devices, is not caused. In addition, unlike conventional attitude detection type operation devices, the camera unit 10 does not require, as a recognition target, any marker or any attachment to be mounted on the user.

In addition, in the one embodiment of the present invention, the camera unit 10 includes both the EDS 12 and the RGB camera 11, is configured to recognize a user on the basis of the event signal 123 in which a time lag is relatively small, and calculates coordinate information regarding the recognized user from the RGB image signal 113 which includes a relatively large amount of information. Consequently, preferable processes can be performed while the advantages of the RGB image signal 113 and the event signal 123 are utilized.

In addition, in the one embodiment of the present invention, the positional information acquisition section 14 of the camera unit 10 acquires the positional information on the image sensor 111 and the sensor 121, and each section of the control section 22 of the information processing apparatus 20 infers the relative positional relation between the display apparatus 40 and the camera unit 10 on the basis of the positional information and the attitude information and performs the coordinate conversion on the basis of the inferred positional relation. Consequently, the installation state of the camera unit 10 can be grasped and reflected in generation of a display image.

In addition, in the one embodiment of the present invention, the coordinate information calculated by the calculation section 15 of the camera unit 10 includes at least one of coordinate information regarding the posture of the user, coordinate information regarding the shape of a user's arm, coordinate information regarding the shape of a user's hand/finger, and coordinate information regarding the attitude of an external apparatus being mounted on or being held by the user. Accordingly, a distinctive condition of the user can be grasped, and the intention or content of a user operation can be precisely grasped.

In addition, in the one embodiment of the present invention, the calculation section 15 of the camera unit 10 calculates coordinate information regarding at least one joint of a person included in a first image (RGB image) that is based on the RGB image signal 113, according to a learned model that is constructed by learning of the relation between an image of a person having multiple joints and coordinate information indicating the positions of the multiple joints. Consequently, the coordinate information regarding the user can be precisely and quickly calculated.

In addition, in the one embodiment of the present invention, when a change amount of the attitude information acquired by the IMU 13 of the camera unit 10 exceeds the prescribed threshold value, the warning section 225 of the information processing apparatus 20 performs the warning action. Therefore, it is possible to prompt the user to change the setting state of the camera unit 10 in a case where the installation state of the camera unit 10 needs to be changed, or in a case where, for example, the installation state of the camera unit 10 is not suitable to calculate coordinate information or coordinate information is difficult to calculate after the installation state of the camera unit 10 is changed.

FIG. 9 is a block diagram depicting a schematic configuration of a system according to another embodiment of the present invention. It is to be noted that FIG. 9 depicts a configuration of a system 2 that includes a server 50 and a terminal device 60 in place of the information processing apparatus 20 in FIG. 2. In FIG. 9, components having substantially the same functions as those in FIG. 2 are denoted by the same reference signs.

In FIG. 9, the server 50 (e.g. a cloud server) is connected to the camera unit 10 and the terminal device 60 in a communicable manner over the Internet network or wirelessly. The server 50 includes the same sections as those in the information processing apparatus 20 in FIG. 2. The server 50 performs various processes based on information outputted from the camera unit 10. In addition, the terminal device 60 includes a communication section 61. The communication section 61 receives information outputted from the server 50. In addition, like the communication section 21 of the information processing apparatus 20 in FIG. 2, the communication section 61 is capable of mutually communicating with the controller 30, and outputs a display image to be displayed on the display apparatus 40. With such a configuration, a procedure from generation of the RGB image signal 113 and the event signal 123 to calculation of the coordinate information is completed in the camera unit 10 alone, and the camera unit 10 outputs the calculated coordinate information and the attitude information on the camera unit 10 to the server 50. Accordingly, in a game system using a server such as a cloud server, the same effect can be obtained.

It is to be noted that the camera unit 10 in each of the abovementioned embodiments includes both the IMU 13 and the positional information acquisition section 14 but the camera unit 10 may include either one of the IMU 13 and the positional information acquisition section 14. In such a case, it is sufficient that the inference section 221 infers the relative positional relation between the display apparatus 40 and the camera unit 10 on the basis of either one of the attitude information and the positional information. In addition, it is sufficient that the conversion processing section 222 performs the coordinate conversion on the coordinate information on the basis of either one of the attitude information and the positional information.

Further, a part of processes that are performed in the information processing apparatus 20 in each of the abovementioned embodiments may be performed in the camera unit 10. For example, the function of the inference section 221 of the information processing apparatus 20 may be provided in the camera unit 10, or the functions of the inference section 221 and the conversion processing section 222 of the information processing apparatus 20 may be provided in the camera unit 10. In such a case, the camera unit 10 outputs coordinate information having undergone the coordinate conversion.

In addition, in each of the abovementioned embodiments, the number of the RGB cameras 11 may be equal to or different from the number of the EDSs 12. In addition, each of the number of the RGB cameras 11 and the number of the EDSs 12 may be one or two or more. For example, in a case where two or more RGB cameras 11 are provided, the range of the field for generating the RGB image signal 113 can be expanded, or the condition of a person can be three-dimensionally inferred from the multiple RGB image signals 113. For example, in a case where two or more EDSs 12 are provided, the range of the field for generating the event signal 123 can be expanded, or the three-dimensional movement amount of a person can be calculated on the basis of the multiple event signals 123.

In addition, the camera unit 10, which has been explained in each of the abovementioned embodiments, may be implemented in a single apparatus, or may be implemented distributedly over multiple apparatuses. For example, at least a part of the sensors may be independently provided while the remaining sections may be implemented in the main body of the camera unit 10.

Some of the embodiments of the present invention have been explained above in detail with reference to the drawings. However, the present invention is not limited to these embodiments. It is clear that a person who has the common knowledge in the technical field of the present invention can conceive of various modifications and revisions within the scope of the technical concept set forth in the claims. These modifications and revisions are also considered to obviously fall within the technical scope of the present invention.

REFERENCE SIGNS LIST 1, 2: System
10: Camera unit
11: RGB camera
12: EDS
13: IMU
14: Positional information acquisition section
15: Calculation section
16: Information output section
20: Information processing apparatus
21, 31, 61: Communication section
22: Control section
32: Operation section
33: Inner force sense presentation section
34: Vibration section
35: Sound output section
40: Display apparatus
42: Display section
50: Server
60: Terminal device
111: Image sensor
112, 122: Processing circuit
113: RGB image signal
121: Sensor
123: Event signal
221: Inference section
222: Conversion processing section
223: Control value calculation section
224: Image generation section
225: Warning section

The invention claimed is:

1. A system comprising:
a first image sensor that generates a first image signal by synchronously scanning all pixels at a prescribed timing;
a second image sensor including an event-driven type vision sensor that, upon detecting a change in an intensity of incident light on each of the pixels, generates a second image signal asynchronously;
an inertial sensor that acquires attitude information on the first image sensor and the second image sensor;
a first computation processing device that recognizes a user on a basis of at least the second image signal and calculates coordinate information regarding the user on the basis of at least the second image signal;
a second computation processing device that performs coordinate conversion on the coordinate information on a basis of the attitude information; and
an image generation device that generates a display image which indicates a condition of the user, on a basis of the converted coordinate information.

2. The system according to claim 1, further comprising:
a positional information acquisition section that acquires positional information on the first image sensor and the second image sensor; and
an inference section that infers a relative positional relation between a display apparatus displaying the display image and the first and second image sensors on a basis of the positional information and the attitude information, wherein
the second computation processing device performs the coordinate conversion based on the positional relation.

3. The system according to claim 1, wherein the coordinate information includes at least one of coordinate information regarding a posture of the user, coordinate information regarding a shape of a user's arm, coordinate information regarding a shape of a user's hand/finger, and coordinate information regarding an attitude of an external apparatus being mounted on or being held by the user.

4. The system according to claim 1, wherein the first computation processing device calculates coordinate information regarding at least one joint of the user according to a learned model that is constructed by learning of a relation between an image of a person having multiple joints and coordinate information indicating positions of the multiple joints.

5. The system according to claim 1, further comprising: a warning section that performs a warning action when a change in the attitude information exceeds a prescribed threshold value.

6. The system according to claim 1, further comprising:
a sensor apparatus that includes the first image sensor, the second image sensor, the inertial sensor, and the first computation processing device; and
an information processing apparatus that includes the second computation processing device and the image generation device, wherein
the sensor apparatus outputs the attitude information and the coordinate information to the information processing apparatus.

7. An information processing method for generating a display image to be displayed on a display apparatus, the method comprising:
acquiring a first image signal generated by a first image sensor that synchronously scans all pixels at a prescribed timing, and a second image signal generated by a second image sensor including an event-driven type vision sensor that, upon detecting a change in an intensity of incident light on each of the pixels, generates the second image signal asynchronously;
recognizing a user on a basis of at least the second image signal and calculating coordinate information regarding the user on the basis of at least the second image signal;
performing coordinate conversion on the coordinate information on a basis of attitude information on the first image sensor and the second image sensor; and
generating the display image so as to indicate a condition of the user, on a basis of the converted coordinate information.

8. A non-transitory, computer readable storage medium containing a computer program, which when executed by a computer, causes the computer to perfrom an information processing method for generating a display image to be displayed on a display apparatus, by carrying out actions, comprising:
a function of acquiring a first image signal generated by a first image sensor that synchronously scans all pixels at a prescribed timing, and a second image signal generated by a second image sensor including an event-driven type vision sensor that, upon detecting a change in an intensity of incident light on each of the pixels, generates the second image signal asynchronously;
recognizing a user on a basis of at least the second image signal and calculating coordinate information regarding the user on the basis of at least the second image signal;
performing coordinate conversion on the coordinate information on a basis of attitude information on the first image sensor and the second image sensor; and
generating the display image which indicates a condition of the user, on a basis of the converted coordinate information.

* * * * *